US011891947B2

(12) United States Patent
Lefebvre et al.

(10) Patent No.: US 11,891,947 B2
(45) Date of Patent: Feb. 6, 2024

(54) AIRCRAFT ENGINE, GAS TURBINE INTAKE THEREFORE, AND METHOD OF GUIDING EXHAUST GASSES

(71) Applicant: PRATT & WHITNEY CANADA CORP., Longueuil (CA)

(72) Inventors: Guy Lefebvre, St-Bruno-de-Montarville (CA); Christopher Gover, Longueuil (CA); Remy Synnott, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/808,385

(22) Filed: Jun. 23, 2022

(65) Prior Publication Data

US 2023/0417174 A1    Dec. 28, 2023

(51) Int. Cl.
| | |
|---|---|
| *F02B 37/02* | (2006.01) |
| *F01D 9/02* | (2006.01) |
| *F04D 29/42* | (2006.01) |
| *F04D 29/38* | (2006.01) |

(52) U.S. Cl.
CPC .............. *F02B 37/02* (2013.01); *F01D 9/026* (2013.01); *F04D 29/386* (2013.01); *F04D 29/42* (2013.01); *F05D 2220/323* (2013.01)

(58) Field of Classification Search
CPC .......... F02C 6/00; F02D 23/00; F02B 37/166; F02B 73/00; F01D 9/048; F01D 9/047; F01D 9/041; F01D 9/026; F02K 5/02
USPC ........................................................ 415/203
See application file for complete search history.

(56) References Cited

U.S. PATENT DOCUMENTS

| | | | |
|---|---|---|---|
| 2,385,366 A | | 9/1945 | Lysholm |
| 2,468,157 A | * | 4/1949 | Barlow ................. F02B 37/105 60/609 |
| 2,497,970 A | * | 2/1950 | Barlow ................. F02B 37/105 416/125 |

(Continued)

FOREIGN PATENT DOCUMENTS

| | | | | |
|---|---|---|---|---|
| CN | 107965354 A | * | 4/2018 | ............. F01D 9/041 |
| CN | 107725195 | | 2/2019 | |

(Continued)

OTHER PUBLICATIONS

Translation—CN-107965354-A (Year: 2023).*

*Primary Examiner* — J. Todd Newton
(74) *Attorney, Agent, or Firm* — Norton Rose Fulbright Canada LLP

(57) ABSTRACT

A gas turbine intake has a swirl housing having a tangential inlet fluidly connecting an exhaust conduit, an annular outlet defined around a central axis and fluidly connecting a turbine gas path, a swirl path extending circumferentially around the central axis from the tangential inlet, and vanes located in the swirl housing, the vanes circumferentially interspaced from one another relative the central axis, each vane having a twisted and flat body having a length extending from a leading end to a trailing end, the leading end being oriented mainly circumferentially and axially at the swirl path, the trailing end being oriented mainly axially and radially at the annular outlet, the twisted and flat body twisting between leading and trailing ends around the central axis, around a radial axis perpendicular to the central axis, and around a tangential axis perpendicular to both the central axis and the radial axis.

15 Claims, 6 Drawing Sheets

(56) References Cited

U.S. PATENT DOCUMENTS

| | | | |
|---|---|---|---|
| 2,500,860 A * | 3/1950 | Penn | F02B 37/105 |
| | | | 60/39.15 |
| 2,801,043 A | 7/1957 | Spotz et al. | |
| 3,396,906 A | 8/1968 | Newton | |
| 4,815,282 A * | 3/1989 | Wilkinson | F02C 6/12 |
| | | | 60/605.1 |
| 4,996,839 A * | 3/1991 | Wilkinson | F02C 6/12 |
| | | | 60/605.1 |
| 5,145,215 A | 9/1992 | Udell | |
| 5,624,229 A * | 4/1997 | Kotzur | F04D 29/441 |
| | | | 415/212.1 |
| 6,302,647 B1 | 10/2001 | Schueler et al. | |
| 6,499,286 B1 * | 12/2002 | Zakharov | F02K 5/02 |
| | | | 60/761 |
| 6,783,321 B2 | 8/2004 | Lathrop et al. | |
| 7,074,009 B2 | 7/2006 | Allmang et al. | |
| 7,147,433 B2 | 12/2006 | Ghizawi | |
| 9,181,855 B2 | 11/2015 | Svihla et al. | |
| 9,328,738 B2 | 5/2016 | Yokoyama et al. | |
| 9,835,165 B2 | 12/2017 | Jinnai et al. | |
| 10,030,581 B2 | 7/2018 | Gekht et al. | |
| 10,428,986 B2 | 10/2019 | Yeandel | |
| 2006/0165521 A1 * | 7/2006 | Kim | F01D 9/026 |
| | | | 415/204 |
| 2014/0212277 A1 | 7/2014 | Uesugi | |
| 2015/0056065 A1 | 2/2015 | Takama et al. | |

FOREIGN PATENT DOCUMENTS

| | | |
|---|---|---|
| DE | 19936170 | 2/2001 |
| EP | 3043056 | 7/2019 |
| GB | 571022 | 8/1945 |
| GB | 2063368 | 6/1981 |

* cited by examiner

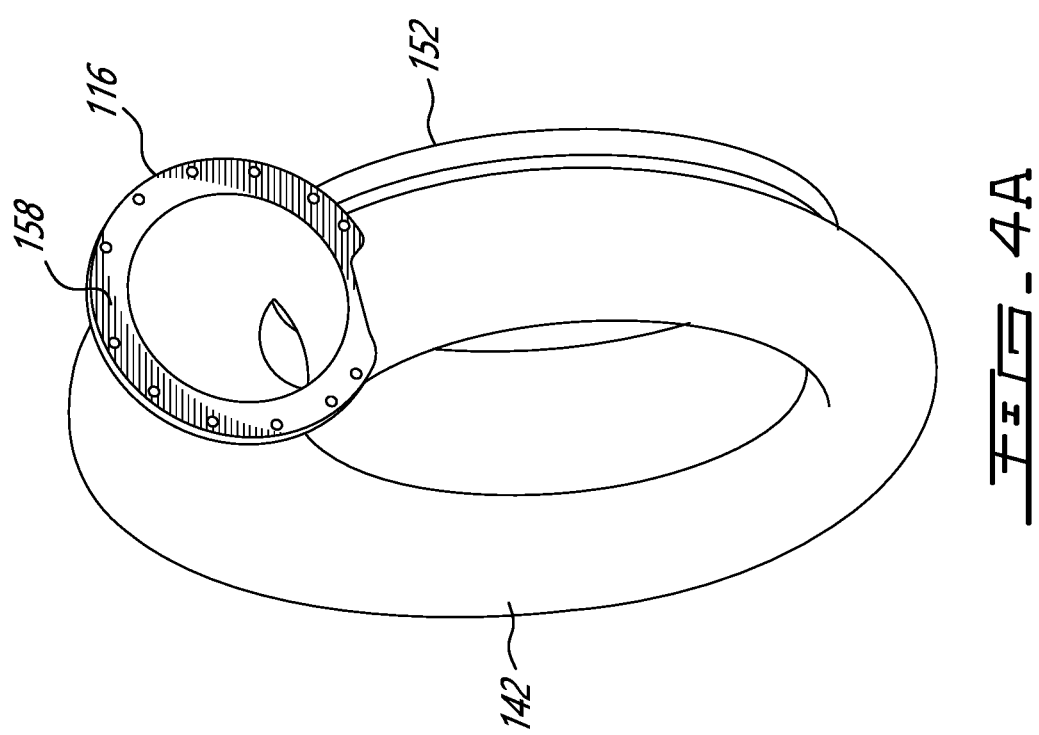

AIRCRAFT ENGINE, GAS TURBINE INTAKE THEREFORE, AND METHOD OF GUIDING EXHAUST GASSES

TECHNICAL FIELD

The application relates generally to aircraft engines and, more particularly, to a gas turbine intake.

BACKGROUND OF THE ART

A gas turbine typically has an annular flow path. In an axial flow path configuration, the annular flow path may extend axially across one or more alternating sets of stator vanes and rotary blades. In a gas turbine engine, the gas path extends annularly and in sequence across one or more compressor stages and a combustor upstream of one or more turbine stages, and the gas turbine in the form of the one or more turbine stages may readily receive an annular flow of hot gasses from the combustor. In some other embodiments, such as gas turbines which can be used for powering a propulsor and/or powering a compressor, the source of hot exhaust gasses may not be readily available in an annular configuration, and a challenge can exist in transitioning the hot exhaust gas flow from its source configuration to an annular configuration. Such challenges can be amplified when taking additional factors into consideration such as limiting aerodynamic losses, limiting weight, limiting manufacturing costs, etc. There always remains room for improvement.

SUMMARY

In one aspect, there is provided an aircraft engine comprising : an exhaust conduit; at least one combustion engine having an exhaust gas outlet fluidly connected to the exhaust conduit; at least one gas turbine having a casing defining a radially outer limit of an annular gas path extending along and around a central axis, and at least one rotor having a shaft concentric to the central axis, a plurality of blades circumferentially interspaced from one another around the central axis and protruding radially from the shaft across the annular gas path; a gas turbine intake having a swirl housing having a tangential inlet fluidly connecting the exhaust conduit, an annular outlet fluidly connecting the annular gas path, a swirl path extending circumferentially around the central axis from the tangential inlet, and a plurality of vanes located in the swirl housing, the vanes circumferentially interspaced from one another relative the central axis, each vane having a twisted and flat body having a length extending from a leading end to a trailing end, the leading end being oriented mainly circumferentially and axially at the swirl path, the trailing end being oriented mainly axially and radially at the annular outlet, the twisted and flat body twisting between the leading end and the trailing end around the central axis, around a radial axis perpendicular to the central axis, and around a tangential axis perpendicular to both the central axis and the radial axis.

In another aspect, there is provided a gas turbine intake comprising : a swirl housing having a tangential inlet fluidly connecting an exhaust conduit, an annular outlet defined around a central axis and fluidly connecting a turbine gas path, a swirl path extending circumferentially around the central axis from the tangential inlet, and a plurality of vanes located in the swirl housing, the vanes circumferentially interspaced from one another relative the central axis, each vane having a twisted and flat body having a length extending from a leading end to a trailing end, the leading end being oriented mainly circumferentially and axially at the swirl path, the trailing end being oriented mainly axially and radially at the annular outlet, the twisted and flat body twisting between the leading end and the trailing end around the central axis, around a radial axis perpendicular to the central axis, and around a tangential axis perpendicular to both the central axis and the radial axis.

In a further aspect, there is provided a method of guiding exhaust gasses to a gas turbine, method includes tangentially receiving the exhaust gasses at a circularly extending swirl path, manifolding the swirl path into a plurality of circumferentially distributed guide paths, each guide path scooping the exhaust gasses at the swirl path and redirecting a circumferential velocity of the exhaust gasses i) radially inwardly and ii) axially, the guide paths collectively outputting an annular, axially oriented, flow of exhaust gasses.

DESCRIPTION OF THE DRAWINGS

Reference is now made to the accompanying figures in which:

FIG. 4A is an oblique view of a gas turbine intake in accordance with a second embodiment;

DETAILED DESCRIPTION

Figure 1:
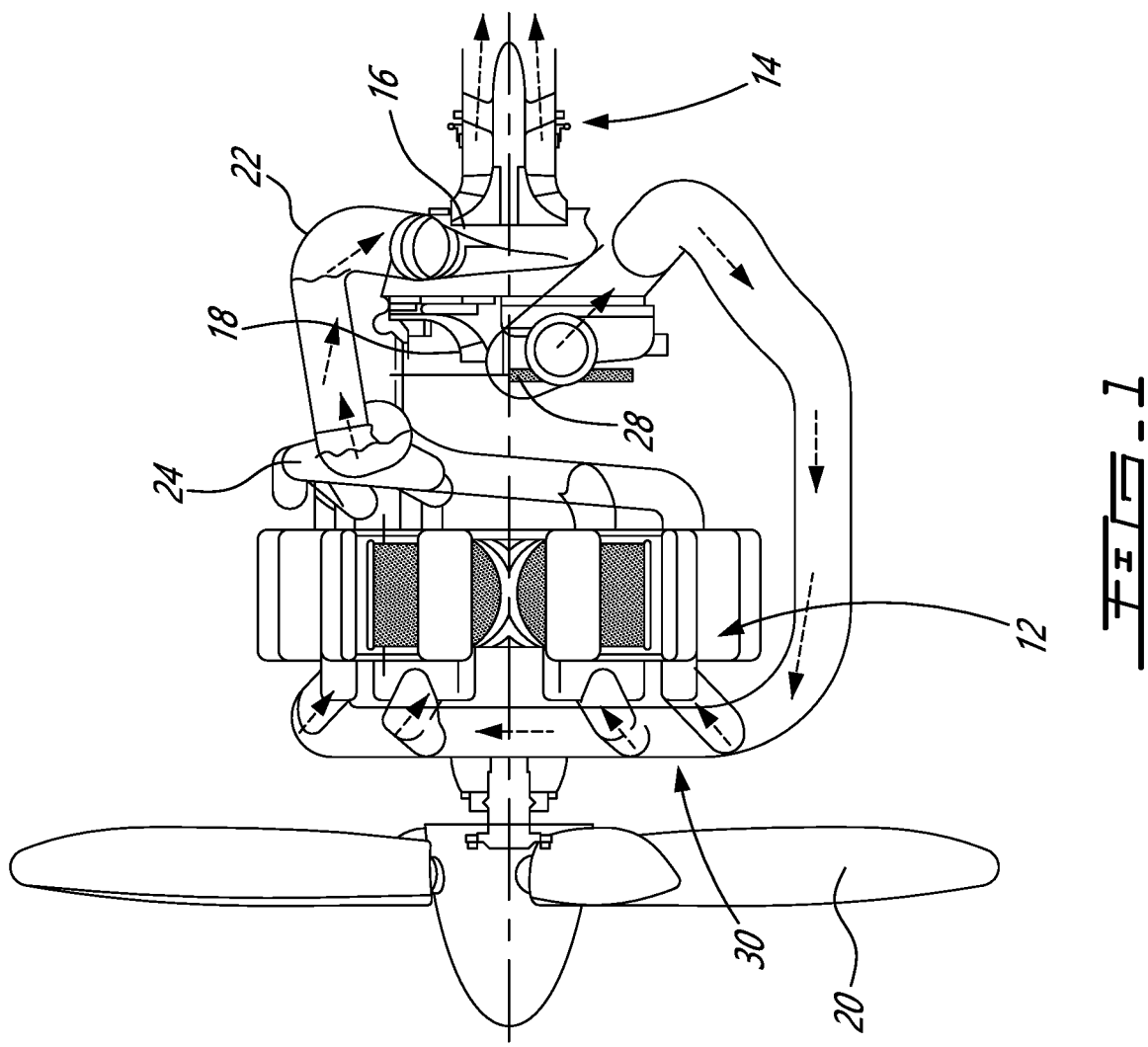
FIG. 1 is a schematic cross-sectional view of a gas turbine engine.

FIG. 1 illustrates an aircraft engine 10 of a type preferably provided for use in subsonic flight, generally comprising a combustion engine 12 in which compressed air is mixed with fuel and ignited delivering power and exhaust gasses. The exhaust gasses are collected from the combustion engine 12 and directed to a gas turbine 14. The gas turbine 14 can convert energy in the form of heat, pressure and/or velocity of the exhaust gasses into angular velocity of a rotor 15, and the rotor 15 can be used to direct power to one or more other device, such as a compressor 18, a propulsor 20 (e.g. propeller, fan), and/or an electric machine acting as a generator. The transfer of power can be direct, or via a clutch and/or a gearbox.

In the illustrated embodiment, the combustion engine 12 can have one or more combustion engine units such as piston engine units, and/or Wankel engine units for instance. The exhaust gasses can be collected from one or more exhaust gas outlet of the combustion engine 12 via an exhaust conduit 22 such as an exhaust pipe, optionally via an exhaust manifold 24 which connects an exhaust pipe to individual engine units. The exhaust conduit 22 can be straight, continuously curved, or made of straight sections interconnected via one or more elbows, to name some examples. The exhaust conduit 22 can provide a linear flow of exhaust gasses, whereas the gas turbine 14 can be configured for receiving an annular stream of exhaust gasses. A gas turbine intake 16 can be provided for connecting the exhaust conduit 22 to the gas turbine 14. The gas turbine intake 26 can be configured for receiving the linear flow of exhaust gasses from the exhaust conduit 22, distributing it circumferentially, re-orienting its velocity from a circumferential to an axial orientation, and feeding it as an axially-oriented annular stream to the gas turbine 14, as will be seen more clearly in FIG. 2.

In this embodiment, a compressor 18 is provided. The compressor 18 can be a centrifugal compressor for instance, and be used to boost the pressure of air from the environment in order to feed higher pressure air to the intake of the combustion engine 12. More specifically, compressed air can be collected from the compressor 18 by a compressed air pipe, such as via a helical scroll 28 for instance, and fed to the combustion engine 12, optionally via an intake manifold 30. The compressor 18 can be powered by the gas turbine 14, by the combustion engine 12, and/or by an auxiliary electric engine, to name some examples. The compressor 18 is optional.

Figure 2:
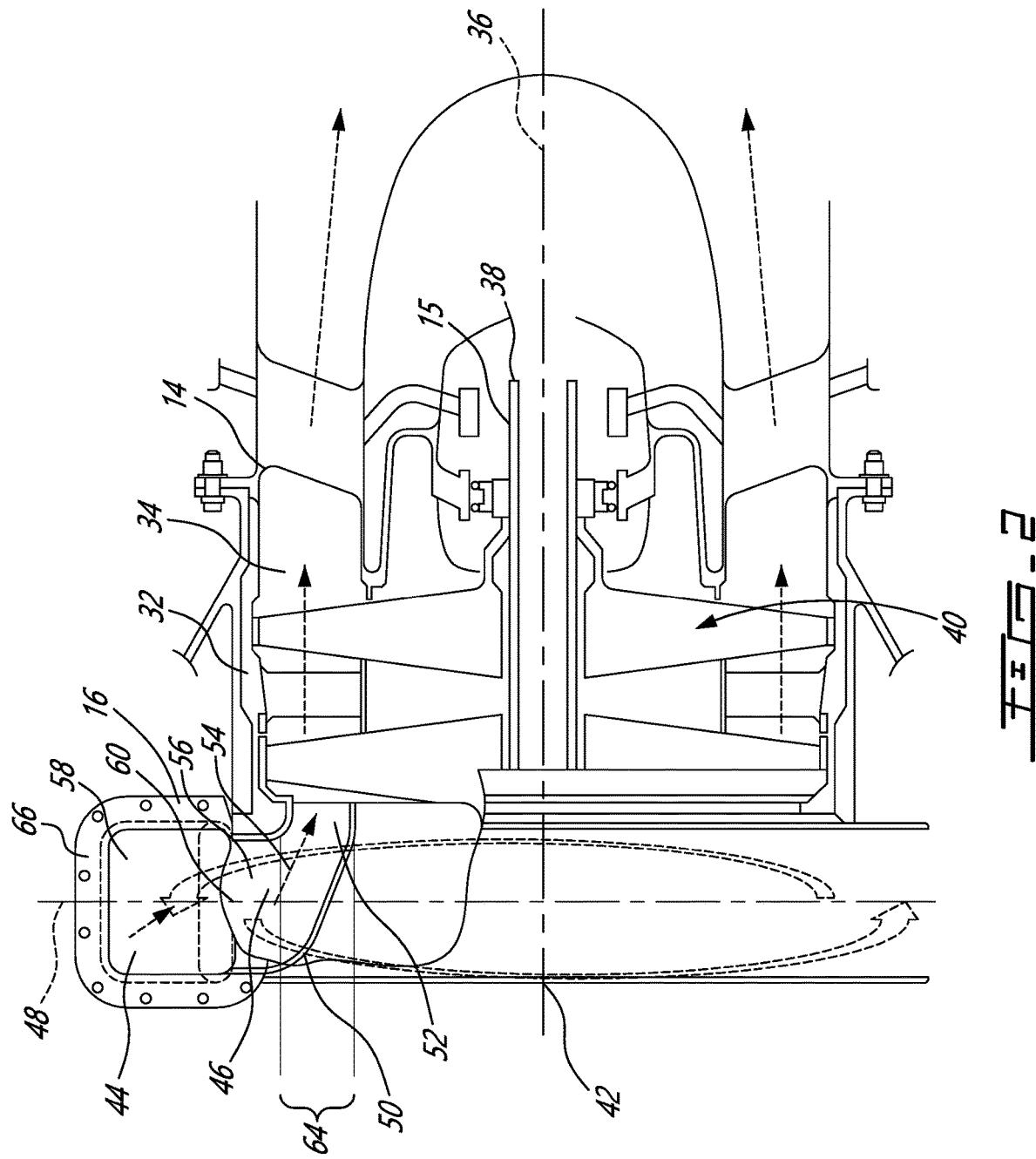
FIG. 2 is a cross-sectional view, enlarged, of a portion of the gas turbine engine of FIG. 1.

FIG. 2 presents a sectioned, enlarged view of an example gas turbine intake 16 coupled to a gas turbine 14. In this example, the gas turbine 14 has a casing 32 defining a radially outer limit of an annular gas path 34 extending along and around a central axis 36, and a rotor 15 having a shaft 38 concentric to the central axis 36. The rotor 15 has a plurality of blades 40, and more specifically in this embodiment an axial sequence of two sets of blades. The blades 40 of each set are circumferentially interspaced from one another around the central axis 36, and the two sets are axially separated from one another by a set of vanes. The blades 40 protrude radially from the shaft 38 across the annular gas path 34. The blades 40 rotate in a plane or in a conical virtual surface, and the gas travels across the blades 40 generally perpendicular to the orientation of the length of the blades 40, i.e. the blades are not configured to carry the fluid along an axial to radial transition such as "impeller" type blades, and both receive and output fluid mainly in the axial orientation (i.e. mainly parallel to the central axis). The vanes are made integral to the casing 32 and are thus non-rotary by contrast with the blades 40. In this example, the radially internal limit of the annular gas path 34 is defined in part by a hub of the vanes, and the vanes protrude radially internally from the outer portion of the casing 32 to the hub. Alternate embodiments can have additional sets of blades, additional sets of vanes, or both additional sets of vanes and blades. While the annular gas path 34 can be said to extend generally axially along the gas turbine 14, it will be understood that in some embodiments, the gas path 34 can extend obliquely or in a curved manner, such as having both conical and cylindrical portions for instance. In some embodiments, it can be preferred to have a set of vanes immediately upstream the first (or only) set of blades, for controlling the swirl in the flow, and/or controlling the angle of attack of the blades relative to the incoming flow of air, which may affect efficiency of energy transfer between the fluid and the blades as known to persons having ordinary skill in the art.

In this embodiment, the gas turbine intake 16 has a swirl housing 42 having a first, radially-outer internal portion thereof forming a swirl path 44. The swirl path 44 extends circumferentially around the central axis 36, and more specifically continuously around the central axis 36 in this embodiment. An inlet 58 can lead tangentially into the swirl path 44. The swirl housing 42 has a second, radially-inner internal portion defining an annular elbow 46 between a radial orientation 48 and an axial orientation 50. The annular elbow 46 is provided radially inwardly of the swirl path 44, and fluidly connects the swirl path 44 to the annular outlet 52. As will be explained below, a plurality of vanes 56 can be provided in the annular elbow 46, the plurality of vanes 56 manifolding the swirl path 44 into a plurality of circumferentially interspaced guide paths 54, wherein each guide path 55 can scoop circumferentially circulating gasses from the swirl path 44 and aerodynamically redirect their circumferential velocity to radially inward velocity and to axial velocity. The redirection can be done aerodynamically in a manner to limit aerodynamic losses. The redirection can be performed in a manner to limit or otherwise control the occurrence of swirl at the annular outlet 52, and to otherwise direct the flow of gasses in a manner to optimize efficiency of the turbine 14.

The gas turbine intake 16, and in particular the swirl path 44, extend generally circumferentially, i.e. in a radially-extending plane 48. The annular outlet 52 of the gas turbine intake leads directly to the annular gas path 34 of the gas turbine 14, i.e. not via a combustor or compressor.

Figure 3B:
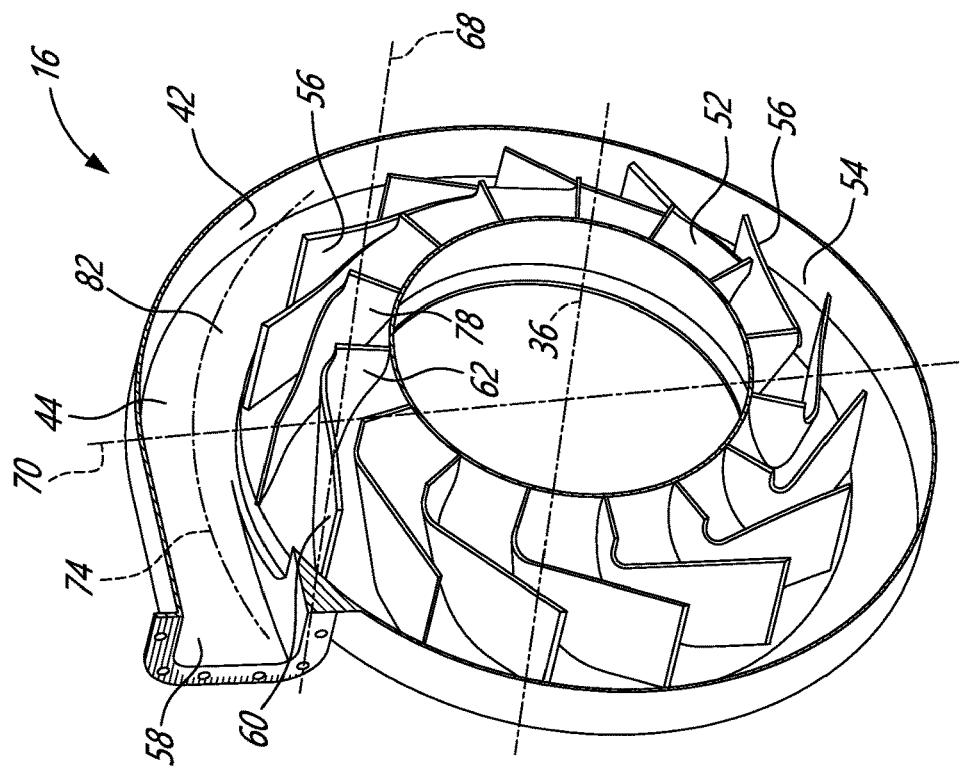
FIGS. 3A to 3D are a collection of views of a gas turbine intake in accordance with a first embodiment, including an oblique view from a proximal side, a partly sectioned view from the proximal side, an oblique and fragmented view from a distal side, and a fragmented tangential view.
Figure 3A:
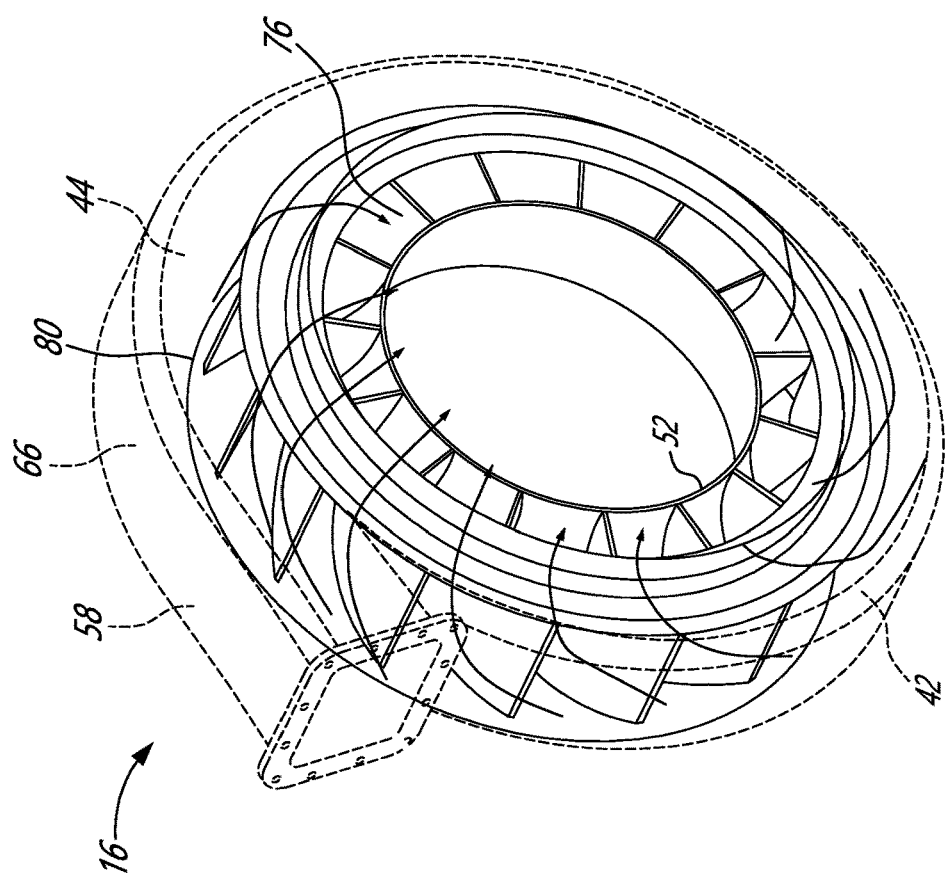

FIGS. 3A and 3B present an example embodiment having such a plurality of vanes 56 in greater detail. The vanes 56 can extend from a leading end 60 configured for scooping circumferentially circulating gasses from the swirl path 44, to a trailing end 62 positioned in the annular outlet 52. The vanes 56 have a (generally) flat body which twists, including by being curved radially outwardly between the trailing end 62 and the leading end 60. As shown in FIG. 2, the leading end 60 can protrude radially outwardly from a virtual axial projection 64 of the annular outlet 62. The swirl path 44 is located yet further radially outwardly than the leading end 60 and can be said to extend between a radially outer edge, or leading edge, of the leading end 60 and a radially outer wall 66.

The circumferential distribution of the vanes 56 can be seen more clearly, as is the configuration where they are circumferentially interspaced from one another relative the central axis 36. Each vane 56 has a twisted and flat body which can be said to have a length extending between the trailing end 62 and the leading end 60. The leading end 60 is oriented mainly circumferentially and axially at the swirl path 44. More specifically, in this embodiment, the leading end 60 slopes radially inwardly from the tangential/circumferential orientation, for scooping gasses from the swirl path 44 and directing them radially inwardly towards the annular outlet 52. The trailing end 62 is oriented mainly axially and radially at the annular outlet 52. The flat body of the vane 56 is twisted along its length. More specifically, the flat body of the vane 56 can be said to be twisted around two axes. Firstly, as seen in the figure, the flat body of the vane can be said to be twisted around the central axis, such as more specifically around an axial axis 68 which is parallel to the central axis 36, as evidenced by the fact that the flat body can be seen to be bent around such an axis 68 between the leading end 60 and the trailing end 62, and that the trailing end 62 terminates radially inwardly relative the leading end 60. Secondly, as seen in the figure, the flat body of the vane 56 can be said to be twisted around a radial axis 70 perpendicular to the central axis 36, as evidenced by the fact that the flat body can be seen to be bent around such an axis 70 between the leading end 60 and the trailing end 62, and that the trailing end 62 terminates axially offset from the leading end 60. The twisting around both axes results in a flat body shape which curves relatively smoothly and aerodynamically between a leading edge 76 of the leading end 60 which can be perfectly axial for instance, and a trailing edge 78 of the trailing end 62 which can be perfectly radial for instance, while being circumferentially, radially, and axially offset from the leading edge 76, with the flat body extending smoothly and continuously, in a twisted manner between the trailing edge 78 and the leading edge 76.

The swirl housing 42 can be said to have a number of generally annularly extending walls. For instance, the swirl housing 42 can be said to have a radially outer wall 66 which can form a radially outer limit of the swirl path 44, an axially proximal wall 80, and an axially distal wall 82. The axially proximal wall 80 can be said to extend annularly and radially between the annular outlet 52 and the radially outer wall 66. The axially distal wall 82 can be said to extend annularly and include a curved portion 86 between a radially-extending portion 84 and an axially-extending portion 88, as best seen in FIG. 3C. More specifically, the radially-extending portion 84 can connect the radially outer wall 66, whereas the axially-extending portion 88 can have a proximal end forming a radially inner edge of the annular outlet 52, the radially outer edge of the annular outlet 52 being formed by a radially inner end of the axially proximal wall 80. The curved portion 86 can be reminiscent of the geometrical shape of a lower, radially-inner, quarter of a torus for example, and can be said to be a toroidally curved portion. The shape of the toroidally curved portion can be for instance a surface of revolution shape resulting from rotating a roughly 90° arc shape around a central axis.

The twisted guide paths 54 can be said to be defined as each extending circumferentially between two adjacent ones of the vanes 56, and between the axially distal wall 82 and the axially proximal wall 80. The twisted guide paths 54 can twist first around an axial axis 68 and then around a radial axis 70 (from the leading end 60 to the trailing end 62). In particular, the curved portion 86 of the axially distal wall 82 can provide for an aerodynamically smooth transition between the radial velocity orientation and the axial velocity orientation. More specifically, an axially proximal edge 92 of the flat body of each vane 56 can join the axially proximal wall 80, and an axially distal edge 84 of the flat body of each vane 56 can join the axially distal wall 82, with corresponding portions of the axially proximal wall 80 and of the axially distal wall 82, and corresponding vanes, forming corresponding walls of each guide path 54. The axially distal edge 94 can be significantly longer in spatial dimension than the axially proximal edge 92, as a result of the twisting of the flat body around the axes. It will be noted in this embodiment in particular that the axially distal edge 94 of the vane body can continuously follow the curved portion 86 of the axially distal wall 82 of the swirl housing 42. In this embodiment, the axially distal edge 94 does so by first extending generally circumferentially, with some degree of radially inward slope, and then gradually curving out axially inwardly, until reaching a generally axial orientation at the trailing end 62 where some degree of slope relative to an axial/tangential plane can be provided in a manner to optimize the orientation of the flow relative the gas turbine 14. A similar configuration can occur at the axially proximal edge 92, and a radially inner end of the axially proximal wall 80 can be similarly curved, though it can be less pronounced as a result of the fact that the radius of curvature can be significantly smaller at the axially proximal wall 80 than at the axially distal wall 82, given the general radial to axial transition geometry.

Figure 3D:
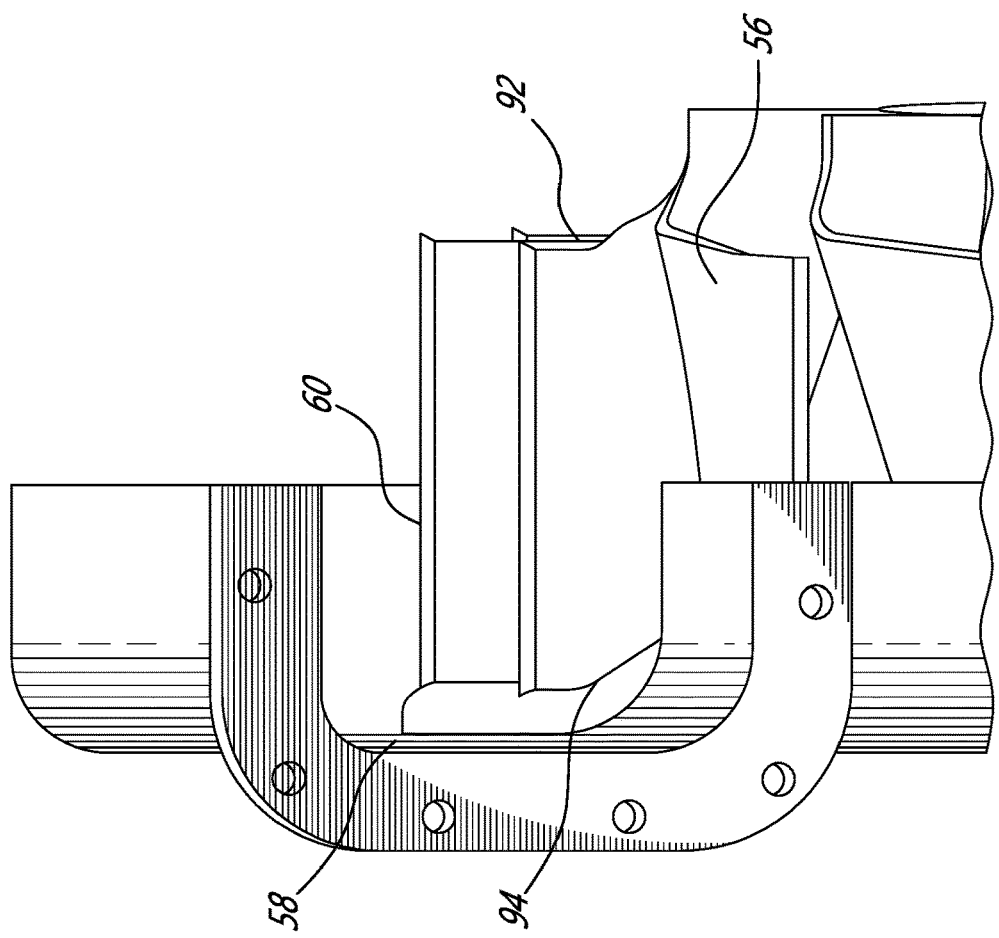
Figure 3C:
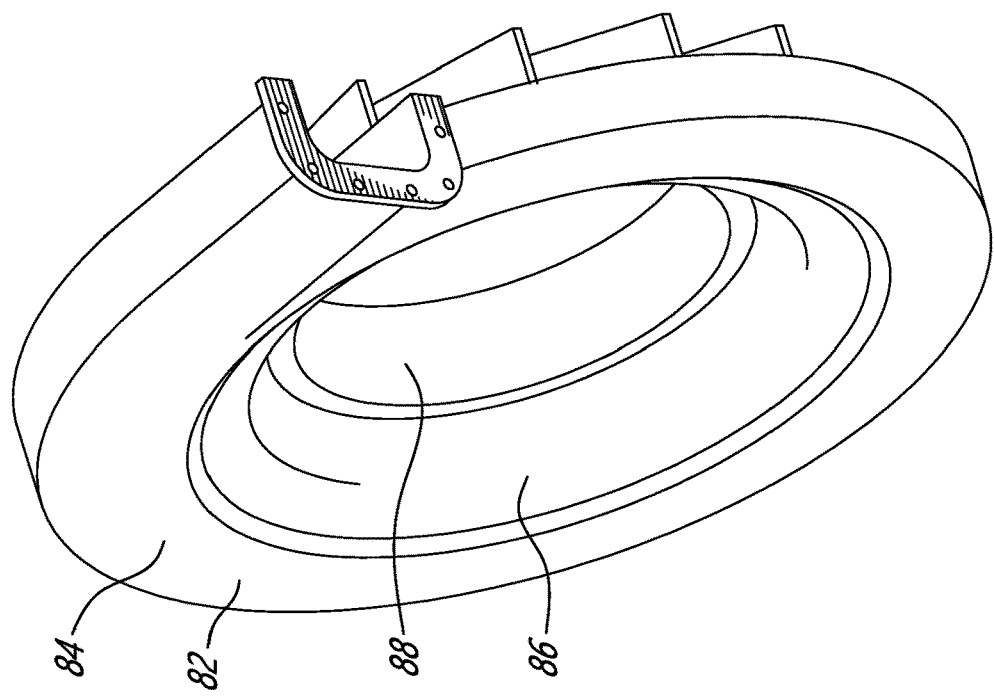

FIG. 3D presents a tangentially oriented, close-up view, of the leading end 60 of some of the vanes 56, through the inlet 58, providing an additional point of view of the geometry of the vanes 56 in accordance with an embodiment.

Figure 4B:
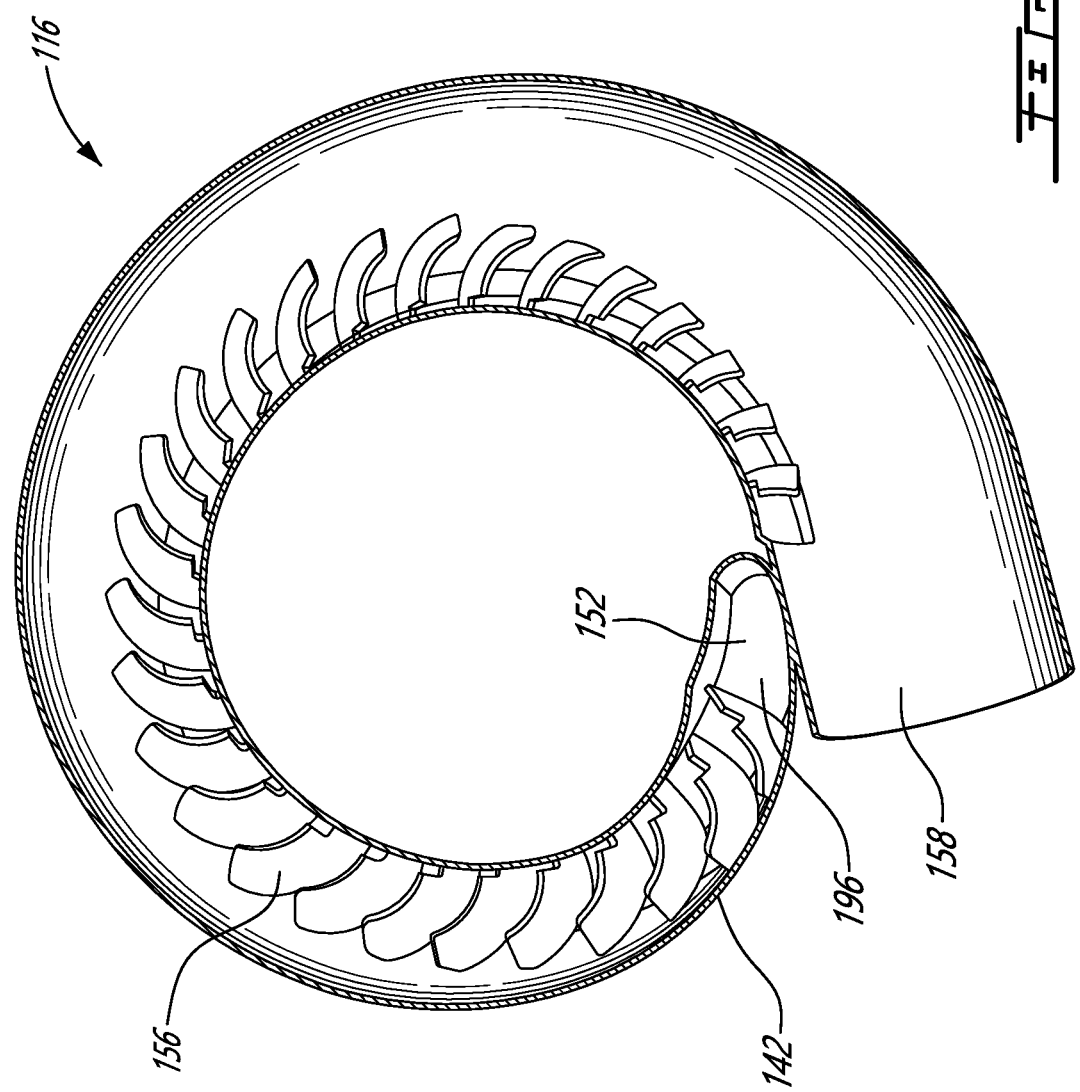
FIG. 4B is a cross-sectional view of the gas turbine intake of FIG. 4A.

FIGS. 4A and 4B present another example embodiment of a gas turbine intake 116. The similarities and differences between the embodiment presented in FIGS. 3A to 3D and the embodiment presented in FIGS. 4A and 4B will now be detailed.

The embodiment presented in FIGS. 4A and 4B also presents a gas turbine intake 116 which has a swirl housing 142 having an inlet 158 for fluidly connecting an exhaust conduit, an annular outlet 152 defined around a central axis for fluidly connecting a turbine gas path, and a swirl path extending circumferentially around the central axis from the tangential inlet. The gas turbine intake 116 also has a plurality of vanes 156 located in the swirl housing 142, the vanes 156 circumferentially interspaced from one another relative the central axis. The vanes 156 each have a twisted and flat body, having a length extending from a leading end to a trailing end, the leading end being oriented mainly circumferentially and axially at the swirl path, the trailing end being oriented mainly axially and radially at the annular outlet 152. The twisted and flat body twists between the leading end and the trailing end around the central axis, and around a radial axis perpendicular to the central axis.

However, contrary to the gas turbine intake 16 presented in FIGS. 3A-3D, the cross-sectional geometry of the gas turbine intake 116 is generally circular rather than generally rectangular (with a rounded edge at the curved portion). Moreover, the swirl path, which extends circumferentially around the central axis, terminates at a distal end 196 opposite the inlet 158, and does not fluidly communicate in a recirculating manner between the distal end 196 and the 158. The geometry of the guide vanes is adjusted accordingly.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, orientations, such as "axial", "radial", "tangential" are provided here in a manner to provide a general indication of how components are configured in three-dimensional space and are not to be interpreted strictly. For instance, "extending radially" means extending, at least to some extent, in the radial orientation. "Extending mainly radially" means extending within 45 degrees, such as within 30 degrees or within 15 degrees, of the radial orientation. Yet further modifications could be implemented by a person of ordinary skill in the art in view of the present disclosure, which modifications would be within the scope of the present technology.

The invention claimed is:

1. An aircraft engine comprising :
    an exhaust conduit;
    at least one combustion engine having an exhaust gas outlet fluidly connected to the exhaust conduit;
    at least one gas turbine having a casing defining a radially outer limit of an annular gas path extending along and around a central axis, and at least one rotor having a shaft concentric to the central axis, a plurality of blades circumferentially interspaced from one another around the central axis and protruding radially from the shaft across the annular gas path; and
    a gas turbine intake having a swirl housing having a tangential inlet fluidly connecting the exhaust conduit, an annular outlet fluidly connecting the annular gas path, a swirl path extending circumferentially around the central axis from the tangential inlet, and a plurality of vanes located in the swirl housing, the vanes circumferentially interspaced from one another relative the central axis, each vane having a twisted and flat body having a length extending from a leading end to a trailing end, the leading end being oriented mainly circumferentially and axially at the swirl path, the trailing end being oriented mainly axially and radially at the annular outlet, the twisted and flat body twisting between the leading end and the trailing end around the central axis and around a radial axis perpendicular to the central axis.

2. The aircraft engine of claim 1 wherein the swirl housing has a radially outer wall forming a radially outer limit of the swirl path, an axially proximal wall extending annularly and radially between the annular outlet and the radially outer wall, and an axially distal wall having a mainly radially-extending portion connecting the radially outer wall, a mainly axially-oriented portion forming a radially inner edge of the annular outlet, and a curved portion bridging the mainly axially-oriented portion and the mainly radially-oriented portion.

3. The aircraft engine of claim 2 wherein the curved portion is a toroidally curved portion.

4. The aircraft engine of claim 2 wherein the swirl path manifolds into a plurality of guide paths, each guide path being delimited between two adjacent ones of the vanes, and between the axially-proximal wall and the axially-distal wall, each guide path having an inlet at the swirl path and an outlet at the annular outlet.

5. The aircraft engine of claim 2 wherein each vane has an axially proximal edge joining the axially proximal wall, an axially distal edge joining the axially distal wall, the axially distal edge being longer than the axially proximal edge, the axially distal edge following the curved portion between the leading end and the trailing end.

6. The aircraft engine of claim 2 wherein the swirl housing has a generally rectangular cross-section with a rounded edge at the curved portion.

7. The aircraft engine of claim 1 wherein the shaft of the gas turbine is mechanically connected to a shaft of the combustion engine.

8. The aircraft engine of claim 1 further comprising a compressor having an outlet fluidly connected to an intake of the combustion engine, the gas turbine mechanically driving the compressor.

9. The aircraft engine of claim 1 further comprising an electric machine operable as an electric generator, the gas turbine operable to drive the electric generator.

10. A gas turbine intake comprising : a swirl housing having a tangential inlet fluidly connecting an exhaust conduit, an annular outlet defined around a central axis and fluidly connecting a turbine gas path, a swirl path extending circumferentially around the central axis from the tangential inlet, and a plurality of vanes located in the swirl housing, the vanes circumferentially interspaced from one another relative the central axis, each vane having a twisted and flat body having a length extending from a leading end to a trailing end, the leading end being oriented mainly circumferentially and axially at the swirl path, the trailing end being oriented mainly axially and radially at the annular outlet, the twisted and flat body twisting between the leading end and the trailing end around the central axis and around a radial axis perpendicular to the central axis.

11. The gas turbine intake of claim 10 wherein the swirl housing has a radially outer wall forming a radially outer limit of the swirl path, an axially proximal wall extending annularly and radially between the annular outlet and the radially outer wall, and an axially distal wall having a mainly radially-extending portion connecting the radially outer wall, a mainly axially-oriented portion forming a radially inner edge of the annular outlet, and a curved portion bridging the mainly axially-oriented portion and the mainly radially-oriented portion.

12. The gas turbine intake of claim 11 wherein the curved portion is a toroidally-curved portion.

13. The gas turbine intake of claim 11 wherein the swirl path manifolds into a plurality of guide paths, each guide path being delimited between two adjacent vanes, and between the axially-proximal wall and the axially-distal wall.

14. The gas turbine intake of claim 11 wherein each vane has an axially proximal edge joining the axially proximal wall, an axially distal edge joining the axially distal wall, the axially distal edge being longer than the axially proximal edge and following the curved portion between the leading end and the trailing end.

15. The gas turbine intake of claim 11 wherein the swirl housing has a generally rectangular cross-section with a rounded edge at the curved portion.

* * * * *